United States Patent [19]

Roebuck

[11] Patent Number: 4,927,038

[45] Date of Patent: May 22, 1990

[54] CONTAINER FOR HIGH PRESSURE GASES

[75] Inventor: Maurice J. Roebuck, Dorking, Surrey, England

[73] Assignee: British Petroleum Company p.l.c., London, England

[21] Appl. No.: 380,056

[22] Filed: Jul. 14, 1989

[30] Foreign Application Priority Data

Aug. 5, 1988 [GB] United Kingdom ............... 8818622

[51] Int. Cl.$^5$ ............................................. B65D 90/04
[52] U.S. Cl. ........................................ 220/3; 156/191; 206/0.6; 220/454; 428/35.8
[58] Field of Search ............... 62/45.1; 156/155, 191; 206/0.6, 524.3; 220/3, 454–457; 428/35.8, 35.9

[56] References Cited

U.S. PATENT DOCUMENTS

| | | | |
|---|---|---|---|
| 2,744,043 | 5/1956 | Ramberg | 154/83 |
| 2,848,133 | 8/1958 | Ramberg | 220/3 |
| 3,073,475 | 1/1963 | Fingerhut | 220/3 |
| 3,654,009 | 4/1972 | Judd et al. | 156/155 |
| 3,815,773 | 6/1974 | Duvall et al. | 220/3 |
| 3,843,010 | 10/1974 | Morse et al. | 220/3 |
| 3,916,048 | 10/1975 | Walles | 428/35.9 |
| 3,921,844 | 11/1975 | Walles | 428/35.9 |
| 3,993,811 | 11/1976 | Walles | 220/456 |
| 4,225,051 | 9/1980 | Faudou et al. | 220/3 |
| 4,360,116 | 11/1982 | Humphrey | 220/3 |
| 4,457,977 | 7/1984 | Walles | 428/35.9 |
| 4,699,288 | 10/1987 | Mohan | 220/3 |
| 4,767,010 | 8/1988 | Logullo, Sr. et al. | 220/3 |
| 4,851,821 | 7/1989 | Howard et al. | 220/455 |

FOREIGN PATENT DOCUMENTS

| | | |
|---|---|---|
| 2516395 | 11/1975 | Fed. Rep. of Germany . |
| 2925536 | 1/1981 | Fed. Rep. of Germany . |
| 3010958 | 10/1981 | Fed. Rep. of Germany . |
| 2193953 | 2/1974 | France . |
| 2309786 | 11/1976 | France . |
| 1023011 | 3/1966 | United Kingdom . |
| 1072502 | 6/1967 | United Kingdom . |
| 1132081 | 10/1968 | United Kingdom . |
| 1495259 | 12/1977 | United Kingdom . |
| 2134984 | 6/1986 | United Kingdom . |

Primary Examiner—Jimmy G. Foster

[57] ABSTRACT

A container for high pressure gases, which comprises a hollow shell of thermoplastic material having an inner surface and an outer surface, at least one of which is covered with a layer comprising a metallized film of plasatics material; and an outer layer comprising fibrous windings bound together with resin.

20 Claims, No Drawings

CONTAINER FOR HIGH PRESSURE GASES

The present invention relates to a container for high pressure gases.

Pure gases, such as hydrogen and oxygen, are currently supplied commercially in steel containers capable of containing very high pressures. Where there is a demand for large volumes of gas, major logistic difficulties are encountered because of the weight of a steel vessel capable of containing a reasonable volume of gas at a very high pressure, often up to about 200 bars. Special handling and storage gear is required to manipulate the large weights involved, and this can be a particular disadvantage in laboratory or medical applications.

Containers for gases at relatively low pressures, for example liquified petroleum gas, have been constructed from materials other than steel. Lightweight containers have been proposed which comprise a liner of thermoplastic material and an overwrap of strong fibres bound together with resin. These can be very satisfactory for low pressures and small volumes of gas. However, it has not proved possible hitherto to construct a viable lightweight container capable of containing pure gases at very high pressures. The permeability of a container consisting solely of a liner of thermoplastic material and an overwrap of strong fibres bound together with resin, is to high to permit the use of such a container for high-pressure gases, particularly those having small molecules, such as hydrogen or oxygen.

In an attempt to solve the problem of permeability whilst reducing somewhat the weight associated with steel containers, containers have recently been manufactured having a solid metal liner overwrapped with fibrous windings reinforced by resin. Various metals, including steel, aluminium and titanium, have been used. Such containers are quite satisfactory in operation, but are either very heavy when using steel, or fairly heavy and extremely expensive when using aluminium or titanium. In addition, the maximum amount of strain tolerated by such a vessel is limited by the strain permitted by the metal liner. This makes inefficient use of the fibres, which are capable of tolerating a greater strain, and increases the cost accordingly.

As long ago as the 1950's, it was proposed in U.S. Pat. Nos. 2,744,043 and 2,848,133 to fabricate a container from resin-gound fibrous windings, optionally surrounding a plastic liner, which could incorporate a layer of metal foil. Thus FIG. 6 of U.S. Pat. No. 2,744,043 and FIG. 8 of U.S. Pat. No. 2,848,133 describe vessels having a layer of metal foil interposed between fibrous windings and a liner. However, metal foils present two serious problems which mean that in practice they cannot be used to cover liners in high-pressure vessels. First, however careful the quality control, commercially-available metal foils always contain a numbers of pin-holes. Thus they would not act as an effective permeability barrier, as high-pressure gas could escape, albaeit slowly, through the pin-holes. Secondly, and most importantly, it is extremely difficult to produce a good fit of a metal foil over a curved surface. If a foil is smoothed over the normally curved surface associated with a high-pressure gas container, the foil becomes bunched and folded, leading to areas where stress is concentrated in the fibrous windings overlaying the foil. These stress concentrations can lead to an unacceptable reduction in the strength of the windings.

U.S. Pat. No. 3,654,009 illustrates a later, and extremly elaborate and expensive, method of producing a light-weight container based on fibrous windings, with a light-weight metal layer to decrease permeability. In that method, a hollow, thick and rigid aluminium liner is prepared. This liner is pleated first with copper, and then with nickel, following which fibrous windings are wound onto the lining, and reinforced with resin. The resulting vessel is of course heavy, and to produce a light-weight vessel, the aluminium liner is dissolved chemically using aqueous caustic soda, leaving the thin layers of copper and nickel. This document illustrates the extraordinary lengths to which inventors have gone to produce light-weight, impervious containers for high-pressure gases.

There remains a need for a high-quality lightweight container capable of being produced commercially at a reasonable cost.

The present invention provides a container for high pressure gases, which comprises a hollow shell of thermoplastic material having an inner surface and an outer surface, at least one of which is covered with a layer comprising a metallised film of plastics material; and an outer layear comprising fibrous windings bound together with resin.

The thermoplastic material used to form the hollow shell may suitably be selected from polyethylene terephthalate, high, medium or low density polyethylene, polypropylene, polyvinyl chloride, polyvinylidene chloride, polymeric fluorocarbons such as polyvinylidene fluoride, polycarbonates, polyamides such as Nylon (Trade Mark), and the like. The material chosen will depend on the temperature stability desired, the gas to be stored and the environment to which the container is likely to be exposed. The hollow shell is suitably of a thickness ranging from 0.5–6.0 mm, preferably 3.0–5.0 mm. The hollow shel is preferably blow-moulded or rotationally-moulded from the appropriate thermoplastic material to the desired thickness. High or medium density polyethylene is an especially preferred material.

The layer comprising a metallised film of plastics material may cover the inner surface of the hollow shell, or its outer surface, or both. For ease of construction, it is usually preferred to cover the outer surface. The film should of course cover substantially all of at least one of the inner and outer surfaces of the hollow shell.

Metallised films are commercially available, and may be prepared by depositing a thin layer of metal on one or both sides of a film of plastics material. If desired, several such layers of metal may be deposited; in this case, the layers may be of the same or different metals. The use of different metals may have advantages depending on the particular gas for which the finished container is intended. The layer or layers of metal may in turn be overlaid by one or more further layears of plastics material. A wide range of plastics materials, for example polyestesr, polyethylene, polyethylene vinyl acetate derivatives, and polyethylene terephthalate, may be used. Suitable metallised films may contain several layers of different plastics mataerials, chosen to impart particular properties to the film. By a suitable choice of materials, the film can be very easy to handle, and if it has an outer layer of a suitable plastic matesrial, can be heat sealed both to the hollow shell and to itself, enabling the shell to be completely covered with a continuous sheet of metallised film.

The thickness of the metallised film is not critical, but may for example be from 50 to 500 microns. If desired, two or more separate layers of film, each with a preferred thickness within this range, may be present in a container according to the invention. The layer of layers of metal may be extremely thin, each for example from 0.01, preferably from 0.02, to for example 0.1 microns thickness. Any metal capable of being formed into a metallised film may be used. Typical metals include aluminium, copper, chromium, nickel, gold, silver, titanium and iron.

The invention also provides a method for fabricating a container according to the invention, which comprises preparing a hollow shell of thermoplastic material having an inner and an outer surface; covering at least one of said sursfaces with a layer comprising a metallissed film of plastics material; wrapping the resulting shell with fibrous windings, said windings being impregnated with resin before or after wrapping; and curing the resin.

In a preferred method of fabricating a container according to the invention, two suitably-shaped bags of metalised plastics film are prepared. The inner surface of the bags is formed of a plastics material which softens on the application of heat. These bags are placed over the top and the bottom of the hollow shell to cover its surface completely, and then fixed in place using heated rollers. In an especially preferred embodiment of the invention, the hollow shell has a short cylindrical central section with domed ends, so that the cylinder has a height of the same order as is diameter, and the metallised plastics film is sproduced in the form of two approximately hemispherical bags one of which preferably has a port opening corresponding to the port opening of the hollow shell.

The outer layer comprises fibrous windings which may be made of any material thermally stable to the desired temperatures. For example, the outer layer may be wound from fibres of carbon, aramid, polyamide, glass, polyestesr, high modulus polyethylene, and the like. Especially preferred are carbon fibres and aramid fibres, especially para-aramid fibres.

Any suitable resin may be used to bind together the fibrous windings. Suitable resins including polyestesr, vinyl ester, thermoplastic, phenolic and epoxy resins. Epoxy resins are especially preferred.

The container according to the invention is preferably of cylindrical shape, preferably with domed end portions. In this case, it is preferable to arrange a first set of axial windings wound at a slight angle to the longitudinal axis of the hollow shell and then overlay a second set of hoop windings circumferentially along the cylindrical length of the shell. Further sets of windings may be added as desired. A wide variety of arrangements for the windings is of course possible.

The thickness of the outer layer may vary widely but for convenience is from 5 to 50 mm depending upon the degree of robustness and insulation desired.

Preferably, the outer layer is formed by positioning the layer comprising a metallised film inside or outside the hollow shell, and rotating the assembly in such a way as to wind on fibres impregnated or coated with uncured or partially cured resin. Once the windings are in place, the resin is cured, if necessary after the addition of further quantities of resin.

The hollow shell is designed having a port opening at its upper end to take the metal end fittings necessary to connect the container to conventional high pressure gas piping.

The finished container will of course be provided with suitable end fittings. It may if desired be provided with a foot, base ring or retractable wheels, or a rigid framework, to facilitate storage and handling.

The container according to the invention is particularly useful for the storage of air or pure, low molecular weight gases, such as hydrogen, oxygen, nitrogen, the noble gases, methane, ethane and carbon dioxide, since these materials, which are gaseous at room temperature, are stored at very high pressures and require vessels of very low permeability. Preferably the container is one capable of withstanding pressures of at least 100 bar, preferably at least 200 bar. The container may of course be used for low-pressure storage if required.

The present invention is further illustrated by the following Examples.

EXAMPLE 1

Container Fabrication

The fabrication of 35.5 liter internal volume vessels was in three stages; firstly, a cylindrical shell (minimum thickness 4.0 mm) was rotationally moulded from Barrothene (Trade Mark) medium density polyethylene (MDPE). This was then encased in two metallised barrier bags. The bags were formed from cut petals of sheet material, joined together by heat welding, to give an approximately hemispherical shape. The bags were made from polyester film coated with a layer of aluminium and provided with a layer of polyethylene adjacent the aluminium, and a layer of polyethylene-vinyl acetate adjacent the polyester, the total thickness being about 100 microns, and the thickness of the aluminium layer being about 0.04 to 0.06 microns. The bags were secured to the liner, polyethylene-vinyl acetate layer adjacent the liner, using hot rollers. Finally, the assembly was encased axially with a fibrous layer using a polar winding technique and then the central parallel portion hoop wound using the same polar winding machine in a simple hoop winding configuration.

Aluminium end fittings were introduced into the liner during rotational moulding; and external fittings, to connect to conventional pressure equipment applied to the outside of these fittings incorporating gas tight seals. Two fibre types were used as reinforcement, carbon and para-aramid (KEVLAR, Trade Mark). Examples using each type of fibre were made and tested to meet industry outline standard for high pressure gas vessels. In each example the axial fibres were laid down around the dome ends at angles of 12.6 degrees for about half of the axial coverage then at around 15 degrees for the remainder. Hoop fibres were then wound along the cylindrical sector. The minimum wall thickness hoop and axial combined was approximately 12mm for the carbon fibre examples and approximately 11 mm for the aramid. The ration of axial to hoop windings at the central region was 5:6, and the total winding time was 1.2 hours.

Full details of the fibre type and resin system are given below.

| Fibres used | Either |
|---|---|
| (1) Carbon | Courtaulds Hysol Grafil XA-S |
| | 800 tex carbon fibre for filament winding |
| or | |
| (2) Kevlar | Du Pont Kevlar 49 |

| | |
|---|---|
| | 510 tex par-aramid fibre for filament winding |
| Resin System | (For all fibres) |
| Epoxy | SHELL 828 (Trade Mark) |
| Catalyst | ANCAMINE D (Trade Mark) (27 parts to 100 parts resin by weight) |

The resin was cured by gelation at room temperature overnight followed by 24 hours at 60° C. The finished weight of the cylinders was 10 Kg for the carbon fibres and 8 Kg for the aramid fibres.

Fire Test

A carbon wound composite vessel was tested using a standard fire test procedure developed for steel high pressure vessels. The vessel was heated using a propane burner stretching the length of the vessel, the heat flux into the vessel being between 32 and 60 kW/mM$^2$, the vessel being situated 4 inches from the heat source. The failure mode was be melting of the liner and end fitting assembly at relatively low pressure, about 155 bar.

Two equivalent steel vessels were tested in a similar fashion. One, a commercial steel cylinder type 'G', failed at high pressure (275 bar) but with a relatively benign effect when the valve fitting fractured; the other, a commercial type 'K' cylinder, failed at high pressure (370 bar) with catastrophic effects. The ratio of time to failure was 1:2:3 (composite:Steel'G':Steel'K').

Fatigue Testing

A carbon wound composite vessel was cyclically pressurised (0 to 200 bars) hydraulically for 10,000 cycles. At the end of the test, it was pressurised to burst at 407 bar. This test shows the excellent fatigue properties of vessels according to the invention.

Permeability Testing

A carbon wound composite vessel was proof tested to 300 bar then held at approximately 190 bar with nitrogen gas. Over a period of 100 days, only negligible creep and gas loss occured.

I claim:

1. A container for high pressure gases, which comprises a hollow shell of thermoplastic material having an inner surface and an outer surface, at least one of which is covered with a layer comprising a metallised film of plastics material; and an outer layer comprising fibrous windings bound together with resin.

2. A container as claimed in claim 1, in which the thermoplastic material used to form the hollow shell is selected from polyethylene terephthalate, polyethylene, polypropylene, polyvinyl chloride, polyvinylidene chloride, polymeric fluorocarbons, polycarbonates and polyamides.

3. A container as claimed in claim 2, in which the thermoplastic material used to form the hollow shell is high or medium density polyethylene.

4. A container as claimed in claim 3, in which the fibrous windings comprise carbon, aramid, polyamide, glass, polyester or high modulus polyethylene fibres.

5. A container as claimed inclaim 4, in which the fibrous windings comprise carbon or aramid fibres.

6. A container as claimed in claim 5, in which the resin used to bind the fibrous windings is selected from polyester, vinyl ester, thermoplastic, phenolic and epoxy resins.

7. A container as claimed in claim 6, in which the metallised film has a thickness of from 50 to 500 microns.

8. A container as claimed in claim 7, in which the or each layer of metal in the metallised film is from 0.01 to 0.1 microns thick.

9. A container as claimed in claim 8, in which the metallised film includes aluminum, copper, chromium, nickel, gold, silver, titanium or iron.

10. A container as claimed in claim 9, in which the metallised film has a layer of plastics material adjacent the hollow shell which has been heat sealed to the hollow shell.

11. A method for fabricating a container for high pressure gases, the method comprising preparing a hollow shell of thermoplastic material having an inner and an outer surface; covering at least one of said surfaces with a layer comprising a metallised film of plastics material; wrapping the resulting shell with fibrous windings, said windings being impregnated with resin before or after wrapping; and curing the resin.

12. A method as claimed in claim 11, in which the metallised film is in the form of two suitably shaped bags, the inner surface of which is formed of a plastics material which softens on the application of heat; the bags are placed over the top and bottom of the hollow shell to cover its surface completely; and the film is fixed in place using heated rollers.

13. The method of claim 12 in which the thermoplastic material used to form the hollow shell is selected from polyethylene terephthalate, polyethylene, polypropylene, polyvinyl chloride, polyvinylidene chloride, polymeric fluorocarbons, polycarbonates and polyamides.

14. The method of claim 13 in which the thermpolastic material used to form the hollow shell is high or medium density polyethylene.

15. The method of claim 14 in which the fibrous windings comprise carbon, aramid, polyamide, glass, polyester or high modulus polyethylene fibres.

16. The method of claim 15 in which the fibrous windings comprise carbon or aramid fibres.

17. The method of claim 16 in which the resin used to bind the fibrous windings is selected from polyester, vinyl ester, thermoplastic, phenolic and epoxy resins.

18. The method of claim 17 in which the metallised film has a thickness of from 50 to 500 microns.

19. The method of claim 18 in which the metallised film includes aluminum, copper, chromium, nickel, gold, silver, titanium or iron.

20. The method of claim 19 in which the metallised film has a layer of plastics material adjacent the hollow shell which has been heat sealed to the hollow shell.

* * * * *